2,725,306
Patented Nov. 29, 1955

2,725,306

PRODUCTION OF COATED BOARD FOR GLOSS INK PRINTING AND ARTICLE PRODUCED THEREBY

Harry C. Fisher and Stanley W. Trosset, Jr., Cincinnati, Ohio, assignors to The Gardner Board and Carton Co., Middletown, Ohio, a corporation of Ohio No Drawing. Application April 20, 1953,
Serial No. 349,958

11 Claims. (Cl. 117—60)

Our invention relates to that mode of producing coated paper or paperboard (and to the type of product produced thereby) wherein the characteristic steps are (a) an initial plasticization of the web surface by passing it through a breaker stack of calender rolls while treating its surface with a plasticizing solution imposed thereon from one or more water boxes on the rolls, (b) the imprinting upon the plasticized surface of a suitable coating composition of mineral coating substance and an adhesive, and (c) drying and calendering the coated web. Such a process is taught in Patent 2,419,207, dated April 22, 1947, to Harry C. Fisher, one of the applicants herein. In accordance with the teachings of this patent, the plasticizing solution may be a solution of polyvinyl alcohol or a solution of gelled starch, or similar materials, or a mixture of such materials. By reason of the plasticization of the surface of the paper or paperboard web, it becomes possible to make an excellent coated product economically by imprinting thereon a very thin layer of the coating composition. A coating composition taught in the aforesaid Fisher patent is a composition comprising suitable mineral coating substances and starch as a binder. Very excellent coated boards have been produced in this fashion having highly attractive coated surfaces well adapted for printing; and such boards have attained wide commercial success.

Procedures for making such coated boards are capable of modification in various ways. By way of example, as taught in Patent 2,515,340, dated July 18, 1950, to Fisher and Sooy, it is possible to make such boards resistant to wet rubbing by the addition of a resinous substance and a catalyst therefor, these substances being imposed upon the board in separate increments. The catalyst may thus be applied as a constituent of the plasticizing solution, and the resin as a constituent of the mineral coating composition, or vice versa. As in the copending application of Stanley W. Trosset, Jr., Harry C. Fisher and Simeon Richard Holmes, Serial No. 164,748, filed May 27, 1950, now U. S. Patent 2,698,259 and entitled Manufacture of Water Finished Board Having an Insolubilized Protein-Mineral Coating Thereon, similar procedures have been applied to the manufacture of coated paper or board in which the adhesive of the mineral coating is casein, a hardening agent for the casein, such as alum, being added separately, as in the plasticizing solution or in a separate operation by means of water boxes on a finishing calender stack, or at both places.

Coated papers and boards produced in this way have had the advantage of substantial economy since very small quantities of the coating substance are employed and, by reason of the pretreatment of the web surface, an imprinting operation serves to give a good surface, rendering unnecessary such operations as smoothing, brushing, casting or the like, practiced upon a layer of wet coating mixture on the surface of the board. Moreover, the coated products have had attractive, smooth, and generally matte surfaces which are excellent for printing both with gloss and non-gloss inks. Where gloss inks are employed, the contrast between the glossy surface of the printed impression and the matte surface of the coated web where ink is absent has been found especially attractive.

It has been recognized, however, that for gloss ink printing the surfaces of these coated papers or boards had under some circumstances a greater absorptivity than was desirable, leading to the use of relatively large quantities of gloss vehicle in the inks employed where the maximum gloss was desired in the printed impression. The present invention deals with the problem of diminishing the effect of this absorptivity without changing the appearance of the coated stock so that the glossy effect of gloss printing inks will be enhanced, and the contrast between its appearance and the appearance of the unprinted coated stock also enhanced. The utility of the coated papers or board of the present invention is not confined to gloss printing operations since the appearance of the printing with ordinary inks is also improved.

The solution of this problem is the primary object of our invention. This and other objects, which will be set forth hereinafter or will be apparent to one skilled in the art upon reading this specification, we accomplish in that procedure and product of which we shall hereinafter describe certain exemplary embodiments.

In the manufacture of the improved product of our invention, it may be stated that we prefer to carry on the plasticization of the board in such fashion that it is very thorough, using for the purpose an increased amount of the plasticizing solution. It will be understood from Patent 2,419,207 referred to above that the imprinting of the coating occurs during a persistence of the plasticizing effect, which means in part that when the surface of the paper or board has been mechanically worked by the action of the rolls of the breaker stack in the presence of the plasticizing solution, the coating is imprinted thereon before the imposed plasticizing solution has thoroughly dried. We have found that the use of greater quantities of the plasticizing solution in the plasticizing step not only has the effect of rendering the paper or board surface itself less absorptive, but also that the plasticizing solution tends in some measure to permeate the imprinted coating, diminishing its absorptivity to a useful extent.

It would ordinarily be thought that the problem of diminishing the absorptivity of a mineral coating on paper or board could be solved in a simple fashion merely by increasing the adhesive:mineral ratio in the suspension or slurry applied to the web for coating purposes. It must be recalled, however, that in a process such as has been described the consistency and characteristics of the mineral coating mixture must be such as to permit imprinting in very thin layers. Thus, for example, the intimate mixture of finely divided mineral material and water solution of adhesive should contain, say, at least 50% of solids by weight, and be of printable consistency. If the quantity of adhesive is increased too greatly at the expense of the mineral matter, the printing consistency of the coating mixture will be altered, the coating will assume a different imprinted pattern; and the desirable matte surface of the finished board will be impaired if the ratio of adhesive to mineral matter becomes too high.

A useful decrease in the absorptivity of the coating to the vehicles of gloss printing inks may be attained by increasing the ratio from, say, 15 parts by weight of adhesive to 100 parts by weight of mineral matter to 20 parts of adhesive to 100 parts mineral matter. The ink vehicles referred to may include varnishes, resins, chlorinated rubber, nitrocellulose, etc. The excess of the adhesive reduces porosity, increases cohesion and, under some circumstances, promotes the adhesion of the coating to the web without significantly altering the desired appearance of the finished product. But at the same time the coating becomes harder, and because it still contains a relatively very large quantity of the mineral matter as compared with the adhesive, a new phenomenon presents a problem. The coating becomes more abrasive and when the coated surface of the finished paper or board is rubbed against itself, or against some other surface, particles of the mineral matter tend to abrade off. This is undesirable in itself and can seriously interfere with printing, and with the final use of the coated article in instances where exposed surfaces are rubbed together, as for example, cartons packed together in a shipping container whereby they rub together in transit. This phenomenon is generally known as "chalking" and it may occur where the ratio of adhesive to minerals is low or high. In the former instance it is due to a deficiency of adhesive to bind the mineral particles together, and in the latter instance to hardness of the coated surface with consequent increase in abrading power. Then, too, the intrinsic strength of a given adhesive is significant regardless of the ratio of adhesive to minerals.

We have found that the chalking difficulty can be corrected through the use, in the way hereinafter outlined, of a water soluble material having the characteristics of a wax. The waxy characteristics of such a material appear to act in some fashion as a lubricant to diminish friction when the product is rubbed or abraded, and the tough nature of the film formed also tends to prevent the loosening of chalk-like particles under abrasion. There are various so-called water soluble waxes which may be employed. Generally these are of the class of polymerized ethylene glycols, referred to hereinafter as polyethylene glycol. Suitable materials are those sold under the trade name "Carbowax" by Carbide and Carbon Chemical Company.

Although these waxes are water soluble in nature, they do not significantly affect the waterproofness of the surface of the coated web. They are preferably not applied as a constituent of the coating composition, but rather as a film in a finishing process. In the preferred practice of our invention the board is first plasticized as described, then coated by imprinting during a persistence of the plasticizing effect. It is usual then to pass the board over a small number of drying rolls and finally through a finishing stack of calender rolls. The water soluble wax, while it may be otherwise applied, is preferably imposed upon the coated web surface by means of one or more water boxes on the finishing calender stack. This insures the imposition of an exceedingly thin and controlled film, as will be understood by the skilled worker familiar with water box application. In the manufacture of imprinted coated board by the procedure generally outlined above, insolubility is frequently desired in the adhesive used as a constituent of the mineral coating composition. Thus where casein or other protein is employed as the adhesive of the mineral coating, insolubility is attained by the use of an agent such as alum which reacts with the casein to render it insoluble. It is not ordinarily desired to mix an insolubilizing agent with the coating composition itself since the reaction will proceed to an undesired extent prior to the imposition of the coating and will interfere with manufacturing operations. As a consequence, the alum is ordinarily imposed upon the surface of the coated web by means of water boxes on the finishing calender stack. This works out well in the practice of our process. The alum, with or without other hardening constituents, is mixed with the water solution of the polyethylene glycol in proper proportions for imposition by means of the water boxes on the finishing calender stack.

Where the adhesive is starch and insolubility is desired, various procedures may be adopted. Insolubility in a starch-mineral coating composition can be attained through the use of a suitable melamine, urea, or other resin and a catalyst. Again, it is not desirable to incorporate both the resin and the catalyst in the coating composition since a premature hardening will take place. In one satisfactory procedure, we incorporate the resin with the plasticizing materials in the water solution applied by means of the water boxes on the initial calender stack mentioned above. The catalyst may then be incorporated in the starch-mineral coating, and the water soluble wax may be employed on the finishing stack of calenders. Again, resin may be incorporated with the starch-mineral coating composition and a catalyst such, for example, as ammonium chloride may be applied together with water soluble wax on the finishing calender stack.

For the purposes of this invention, we have found no substitute for the use of the water soluble wax as a finishing material. Carboxymethylcellulose or other soluble cellulosic compounds may be employed in the water boxes of a finishing calender stack; but while these may affect to a certain extent the permeability of the coating, they do not have the lubricating effect which has been described and hence do not cure the chalking. Moreover, the water soluble waxes which have been described produce a tough film which not only binds the mineral particles together at the surface of the coated product, but also is resistant to the non-water vehicles of inks. Emulsions or dispersions of substances readily compatible with the ink vehicles are not suitable since they tend to increase the penetration of the mineral base by the vehicles of inks. It is a characteristic of the water soluble waxes that, when applied as taught, they cure the chalking difficulty without significantly affecting the appearance of the coated product. Paperboard or boxboard is used in very large quantities for the formation of cartons and the like involving the gluing of portions of the board together in a lapped joint. It is desired, therefore, to gain the advantages set forth above with a material which will neither adversely affect the affinity of the coated surface of the board for water vehicle glues or the like but which also will leave the coated surface of the board sufficiently penetrable by water to permit a rapid setting of the glue. These functions are admirably served by the water soluble waxes, whereas materials having a lubricating action but incompatible with water would seriously interfere with gluing.

By a combination of the three factors which have been described, namely a thorough plasticization of the surface of the board or paper, the use of a somewhat increased ratio of adhesive to mineral matter in the coating and the finishing of the product with a thin and uniform application of the water soluble wax, we attain a greatly improved printing quality and entirely satisfactory imperviousness to the gloss vehicles of glossy printing inks while retaining the essential appearance of the coated product made in the ways described.

*Example 1*

A 5% solution of polyvinyl alcohol was made up for use in the water box or boxes of the initial breaker calender stack. The solution desirably has a low intrinsic viscosity and to this end a polyvinyl alcohol was chosen which is sold under the trade name "Elvanol 7005" by the E. I du Pont de Nemours & Co. This polyvinyl alcohol exhibits a viscosity of 4 to 6 centipoises in a 4% water solution by the Hoeppler falling ball method. The solution was made up by agitating the polyvinyl alcohol in water with a suitable mechanical mixing device and heating to about 180° F. until the polyvinyl alcohol was completely dissolved. The freshly made board was passed through a 9-roll breaker calender stack and the polyvinyl alcohol solution was applied to the surface of the board to be coated by means of a water box on the fourth calender roll, the remaining rolls at their respective nips mechanically working the surface of the board in the presence of the polyvinyl alcohol. Additional applications may be made if desired by means of additional water boxes. The web surface is roughest at the first roll nip and will absorb more of the polyvinyl alcohol solution there, which is desirable from the standpoint of plasticization, but mechanically the moving web performs better on the stack if treated at a lower or later nip. At later nips in the breaker calender stack, an application of polyvinyl alcohol solution produces a greater coating action with less total penetration. The limiting factor in plasticizing the surface of the web to be coated is the standard weight-thickness values recognized in the industry; and the strength of the polyvinyl alcohol solution, while it may be varied, is largely dependent on the factors of cost and viscosity. Too great a viscosity of polyvinyl alcohol will require a lower content of it in the calender solution to prevent the solution from being so thick and sticky that it will stick to and pull fibers from the paper surface and thus detract from the plasticization of the paper surface. The temperature of the polyvinyl alcohol solution in the calender box ranged between 140° and 170° F. The temperature may be varied through rather wide limits, but an elevated temperature is generally desirable for the plasticizing action. The application in the exemplary instance was carried on by means of one water box and was of the order of 10 gallons of the polyvinyl alcohol solution per ton.

Instead of polyvinyl alcohol, it is possible to employ other plasticizing materials. Modified or converted starch, carboxymethylcellulose or any of the other soluble celluloses may be employed either alone or in admixture with polyvinyl alcohol. Alginic or proteinaceous substances may also be used alone or in admixture with any of the other substances mentioned.

A coating composition was prepared containing 20 parts of casein by weight in water solution to 100 parts of finely divided mineral coating material, the latter being dispersed and suspended in the casein solution, with the help of a complex phosphate as a dispersing agent to the extent of producing a coating composition containing from 50% to 55% total solids and being of imprinting consistency. Soda ash was added to assist in the dissolving of the casein. Among other materials suitable for this purpose are ammonia and borax. A lubricating agent such as soap may be added if desired in small quantities to assist in the imprinting and subsequent calendering operation. A small amount of coloring matter may be added to tint the mixture to a desired cast of white. The mineral coating material was in this instance made up of equal parts of titanium dioxide and clay. Since the coating is applied in an exceedingly thin layer, a high opacity coating material is desirable.

The coating was applied by an imprinting roll as part of a coating train of rolls such as illustrated and described in the said U. S. Patent 2,419,207. The thickness of the applied coating was approximately one quarter of one one-thousandth of an inch representing an application of about two pounds of coating solids per 1,000 square feet of the board surface.

The board was then sent over a sufficient number of drying rolls to dry it and was passed to a 9-roll finishing calender stack. A solution was made up containing 4% dry alum and 4% Carbowax solids in water. The alum employed was regular papermaker's dry, pulverized alum of 17% $Al_2O_3$ content and the Carbowax employed was grade PF45 of 50% soluble wax solids. The alum and Carbowax were agitated in water with air until completely dissolved. Live steam may be used for this purpose if desired, but the treatment should not be continued after complete solution. In the exemplary instance one pint of formalin (40% formaldehyde in water) was added to each 100 gallons of the solution. The solution was applied to the mineral coated surface on a water box on the final calender stack at the temperature as made; a regulation of the temperature of the solution in the water box at optimum conditions is helpful in maintaining uniformity of its calendered effect.

The resultant board was a smoothly coated sheet having an attractive white matte surface, waterproof in the sense that it was free of wet rubbing tendencies, free of chalking tendency and having superior printing quality as respects printing inks in general but especially as to gloss printing inks, which dried thereon with a markedly greater degree of gloss.

*Example 2*

A freshly made boxboard was plasticized as set forth above and, during a persistence of the plasticizing effect, was coated by imprinting with a coating composition containing 23 parts by weight of starch as an adhesive to 100 parts by weight of mineral coating material as set forth above, the coating composition also containing sufficient melamine or urea resin to give resistance to wet rubbing when the resin is polymerized. A small amount of coloring matter may be used to achieve the desired cast of white. The coating was accomplished as set forth above, the thickness of the coating being the same, and the coating was then dried.

The coated board was passed to a finishing stack of calenders and there treated with a solution containing 4% Carbowax solids and about 4% ammonium chloride to catalyze the resin, the remainder of the solution being water.

The result again was a board having a smooth, attractive, opaque, matte coating resistant to wet rubbing, resistant to chalking and having superior printing characteristics.

As an alternative procedure, the resin may be incorporated in the plasticizing solution on the initial calender stack and the ammonium chloride incorporated in the coating composition, the treating solution on the final calender stack being a solution of the water soluble wax in water without other additives.

In another procedure, the catalyst may be incorporated in the plasticizing solution on the initial calender stack and the resin incorporated in the coating composition, the treating solution on the final calender stack being a solution of the water soluble wax in water without other additives.

The quantity of the water soluble wax in the final treatment solution may be varied taking into account cost, viscosity and the general desirability of avoiding the application of so great a quantity of the wax solids as materially to affect the appearance of the coated web and its ability to receive printing inks. Ordinarily we prefer to employ a solution containing substantially 2% to 7% of the water soluble wax. It is a characteristic of the solutions taught herein for use on the finishing calender stack that they will not cause sticking or picking of the coated surface thereon even in those instances where the agent relied upon to impart non-wet-rubbing characteristics to the board is incorporated in the final treatment solution.

Modifications may be made in our invention without departing from the spirit of it. Having thus described our invention in certain exemplary embodiments, what we claim as new and desire to secure by Letters Patent is:

1. A process of making coated paper or board webs which comprises plasticizing a surface of said webs, during the persistence of the plasticizing effect imprinting thereon a mineral-adhesive coating composition, drying the webs, passing the webs through a finishing calender stack and imposing on the coated surfaces of said webs a solution of a water soluble wax by means of at least one water box on the said finishing calender stack.

2. The process claimed in claim 1 wherein the coating composition employed is one suitable for imprinting and contains substantially 20 parts by weight of adhesive to 100 parts by weight of mineral coating substance, the water soluble wax applied during the finishing step serving to lubricate and to increase the toughness of the mineral coated surface.

3. The process claimed in claim 2 wherein the said solution of water soluble wax contains also an agent acting to insolubilize the said adhesive in the mineral coating composition.

4. The process claimed in claim 2 wherein the said coating composition contains casein as the adhesive and the said solution of water soluble wax contains alum as a hardening agent for said casein.

5. The process claimed in claim 2 wherein the coating composition after imprinting contains a resin and starch as the adhesive, and the said solution of water soluble wax contains also a catalyst for said resin.

6. The process claimed in claim 2 wherein a resin is employed in a solution used in the said plasticizing step and wherein the said coating composition is a composition in which starch is the adhesive and contains also a catalyst for said resin.

7. A process of producing a matte coated web which is resistant to penetration by the gloss vehicles of glossy printing inks which process comprises passing a paper or paperboard web through a breaker stack of calenders while applying to at least one of its surfaces a plasticizing solution comprising a material chosen from a class consisting of polyvinyl alcohol, soluble cellulose, starch and proteinaceous and alginic substances and mixtures thereof to the extent of thoroughly plasticizing the said surface, and during a persistence of the plasticizing effect imprinting upon the said surface an adhesive-mineral coating composition of suitable consistency for imprinting and to a thickness of approximately 0.00025 in., the said coating composition containing at least around 20 parts by weight of adhesive to 100 parts by weight of mineral coating substance, drying the imprinted board and passing it through a finishing calender stack while applying to its surface a water solution of polyethylene glycol.

8. The process claimed in claim 7 wherein the coating composition contains casein as the adhesive and wherein the solution of water soluble wax contains also a hardening agent for said casein.

9. The process claimed in claim 7 wherein the imprinted coating contains starch as an adhesive, a melamine resin as an insolubilizing agent, the process including the step of catalyzing the said resin.

10. The process claimed in claim 7 wherein the imprinted coating contains starch as an adhesive and a urea resin as an insolubilizing agent, the process including the step of catalyzing said resin.

11. A fibrous web coated by imprinting and having a matte surface substantially free of chalking tendency and having improved printing characteristics, said coated web bearing a coating containing at least about 20 parts by weight of adhesive to 100 parts by weight of mineral matter and carrying a thin, uniform, film-like application of water soluble wax.

References Cited in the file of this patent
UNITED STATES PATENTS

| 2,082,193 | Wells | June 1, 1937 |
| 2,419,207 | Fisher | Apr. 22, 1947 |
| 2,515,340 | Fisher et al. | July 18, 1950 |
| 2,520,900 | Frost | Sept. 5, 1950 |
| 2,611,717 | Sooy et al. | Sept. 23, 1952 |

OTHER REFERENCES

Synthetic Organic Chemicals, 12th ed., Carbide & Carbon Chemicals Corp., 1947. (Only pp. 19–23 relied upon.)